(12) United States Patent
Menéndez Martin

(10) Patent No.: US 7,542,632 B2
(45) Date of Patent: Jun. 2, 2009

(54) COMPOSITE STRUCTURE WITH OPTICAL FIBER EMBEDDED IN ONE OF ITS SURFACE LAYERS AND A PROCESS FOR ITS CONNECTION AND REPAIR

(75) Inventor: José Manuel Menéndez Martin, Madrid (ES)

(73) Assignee: Airbus Espana, S.L., Madrid (ES)

( * ) Notice: Subject to any disclaimer, the term of this patent is extended or adjusted under 35 U.S.C. 154(b) by 0 days.

(21) Appl. No.: 11/441,273

(22) Filed: May 25, 2006

(65) Prior Publication Data
US 2007/0122099 A1 May 31, 2007

(30) Foreign Application Priority Data
Nov. 30, 2005 (WO) ................ PCT/ES2005/070167

(51) Int. Cl.
*G02B 6/00* (2006.01)
*B21D 39/00* (2006.01)
(52) U.S. Cl. ............................ 385/12; 385/13; 428/621
(58) Field of Classification Search ....................... None
See application file for complete search history.

(56) References Cited

U.S. PATENT DOCUMENTS

| | | |
|---|---|---|
| 3,466,219 A | 9/1969 | Schwartz |
| 3,716,869 A | 2/1973 | Gould, Jr. et al. |
| 3,755,713 A | 8/1973 | Paszkowski |
| 4,221,041 A | 9/1980 | Hufnagl et al. |
| 4,318,954 A | 3/1982 | Jensen |
| 4,789,416 A | 12/1988 | Ford |
| 5,253,310 A * | 10/1993 | Delbare et al. ................ 385/14 |
| 5,346,367 A | 9/1994 | Doolin et al. |
| 5,979,046 A * | 11/1999 | Glowasky et al. ............. 29/855 |

(Continued)

FOREIGN PATENT DOCUMENTS

| | | |
|---|---|---|
| DE | 103 26 422 A1 | 6/2003 |
| EP | 1 072 396 B1 | 6/2006 |
| JP | 2000340907 A * | 12/2000 |

OTHER PUBLICATIONS

English Translation of JP 2000340907 A, [online], [retrieved on Feb. 17, 2007] Retrieved from the Industrial Property Digital Library of the Japan Patent Office using Internet <URL: http://www19.ipdl.ncipi.go.jp/PA1/cgi-bin/PA1INDEX>.*
English Abstract of DE 103 26 422 of Jun. 2003.

*Primary Examiner*—Omar Rojas
(74) *Attorney, Agent, or Firm*—Ladas & Parry LLP

(57) ABSTRACT

The invention relates to a composite structure (11) formed by a plurality of layers (13, 15, 15, 19, 21, 23) including an optical fiber (25) for structural monitoring purposes which is at least partly embedded in a surface layer (13) of said structure (11), and insulation means of the optical fiber (25) areas susceptible to repair with respect to the surface layer (13) in which they are integrated, particularly a protective cover (27) and top and bottom separating films (31, 33), and a process of repairing said areas comprising the following steps: removing the protective cover (27) and the top separating film (31), extracting the area, repairing the optical fiber, relocating the area and providing a new protective cover (27).

16 Claims, 5 Drawing Sheets

U.S. PATENT DOCUMENTS

| | | | |
|---|---|---|---|
| 6,035,084 A * | 3/2000 | Haake et al. | 385/49 |
| 6,173,090 B1 * | 1/2001 | Simon et al. | 385/12 |
| 6,432,507 B1 | 8/2002 | Brick et al. | |
| 6,460,240 B1 | 10/2002 | Kielies et al. | |
| 6,952,505 B2 * | 10/2005 | Aldridge et al. | 385/14 |
| 7,008,580 B2 | 3/2006 | Eberth et al. | |

* cited by examiner

COMPOSITE STRUCTURE WITH OPTICAL FIBER EMBEDDED IN ONE OF ITS SURFACE LAYERS AND A PROCESS FOR ITS CONNECTION AND REPAIR

FIELD OF THE INVENTION

The present invention relates to a composite structure incorporating embedded optical fiber for structural monitoring purposes, and more particularly to a composite structure of an aircraft, as well as a process for its connection and repair.

BACKGROUND OF THE INVENTION

The intensive introduction of advanced composites in primary structures has become a fundamental process of structural optimization (based on weight savings and the improvement of mechanical properties), one of the top priorities in the design and manufacture of a new generation of aircrafts. The introduction of an effective structural monitoring system capable of predicting the failure of load paths in a structure designed according to damage tolerance criteria would allow optimizing its design and, accordingly, reducing its weight.

Optical fiber sensors can be effectively used to measure thermomechanical deformation and even to detect damage events operating both alone in passive structural monitoring systems and in combination with other devices, forming an active monitoring system. One of their main advantages is their capacity to be embedded in composite structures, being intimately integrated into the structures.

However, one of the drawbacks of this integration is the difficulty that the integration of the optical fiber has under real laminate manufacturing conditions and the repair of these same fibers once they are embedded. Optical fiber has extremely small dimensions and due to its fragility, it is difficult to handle during the handling operations associated to the integration processes during the manufacture of the laminate, the manufacture of the vacuum bag and curing in the autoclave (or any other alternative laminate consolidation process), the connectorization and subsequent maintenance and/or repair operations of the same optical fiber of the housing laminate. In particular, the scarce possibilities of accessing the optical fiber once it is embedded are very slim and even slimmer yet with regard to its successful repair, which is incompatible with the reparability requirements needed when the structural health and maintenance criteria are bound to the correct working of the network of sensors integrated in the structure.

The present invention is aimed at solving this drawback.

SUMMARY OF THE INVENTION

In a first aspect, the present invention proposes a composite structure formed by a plurality of layers including an optical fiber for structural monitoring purposes which is at least partly embedded in said structure in a surface layer thereof and which also includes insulation means of the areas of said optical fiber susceptible to repair with respect to the surface layer in which they are integrated.

These insulation means protect the optical fiber during the structure manufacturing process and allow subsequent access thereto for its maintenance (connection, modification of the line or damage repair while in service) without significantly affecting the integrity of the structure.

In a second aspect the present invention proposes a process of repairing the optical fiber embedded in said composite structure comprising the following steps:

Removing the insulation means from the optical fiber area in need of repair.
Extracting the optical fiber area in need of repair from the composite structure.
Repairing the optical fiber.
Relocating the repaired optical fiber area in the composite structure.
Providing a new protective cover on the repaired optical fiber area.

The optical fiber integration techniques proposed in this invention allow embedding optical fiber in composite structures, assuring the continued existence of the former at the points of entry in the structure and allowing access to the fiber at these points of entry or at intermediate points for its maintenance (connection, modification of the line or damage repair while in service), all this without significantly affecting the structural integrity of the laminate.

Other features and advantages of the present invention will be understood from the following detailed description of an illustrative embodiment of its object in relation to the attached drawings.

DETAILED DESCRIPTION OF THE INVENTION

Figure 1:
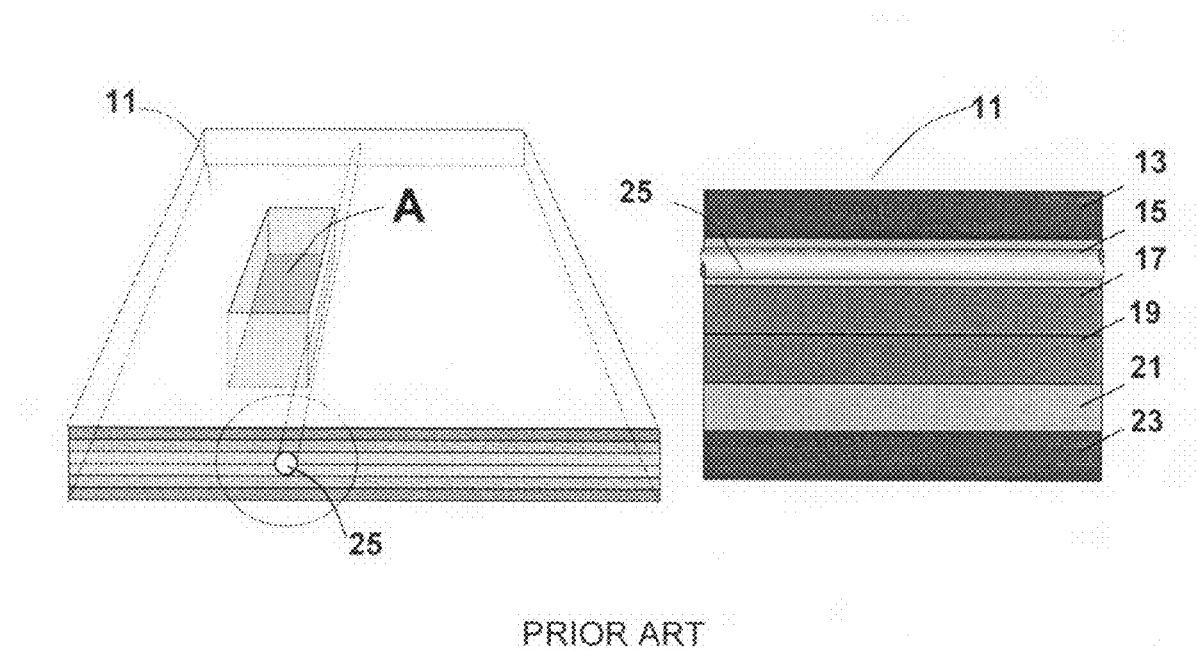
FIG. 1 shows a schematic perspective view of a composite structure known in the art formed by six layers with an optical fiber embedded in one of its sides longitudinally to the reinforcement fibers and a cross-sectional view of area A of said structure.

FIG. 1 shows a composite structure 11 known in the art formed by a plurality of layers 13, 15, 17, 19, 21, 23 with an optical fiber 25 embedded within it that can be part of both a sensor network and part of a data transmission element embedded within it. The integration of this fiber 25 in the structure 11 is a complex and delicate process, especially regarding the points of entry of the is fiber 25 in said structure, required for its connection to the outside, and the continued existence of these points during the consolidation process.

Figure 2:
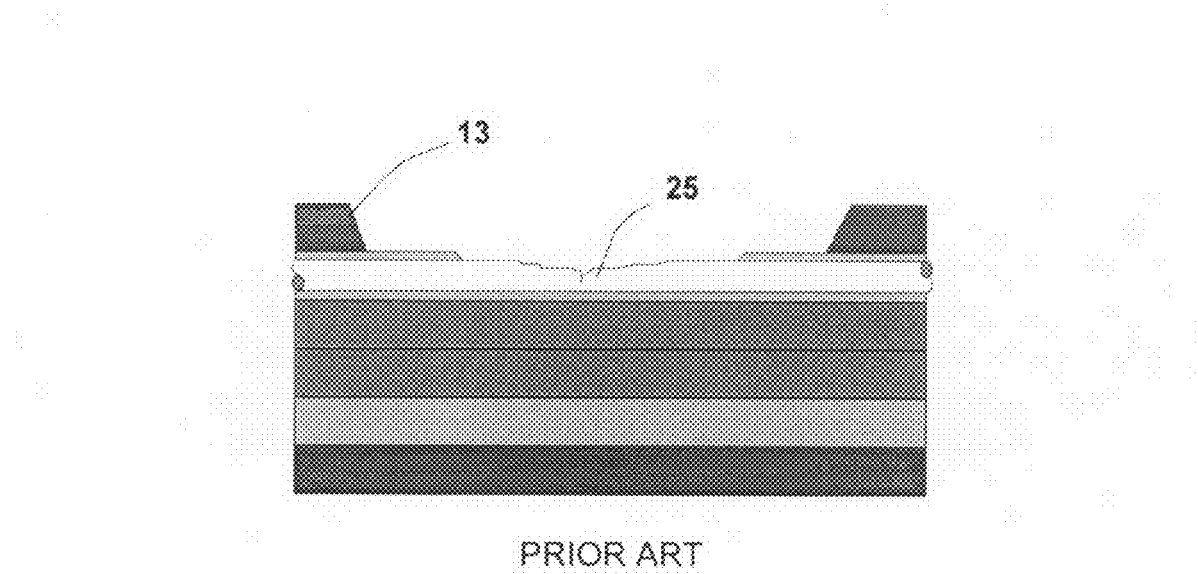
FIG. 2 shows a cross-sectional view of the structure of FIG. 1 in which, using conventional composite structure repair techniques, parts of the surface layer and the second surface have been removed by means of sanding until reaching the embedded optical fiber that has been damaged during the process.

Furthermore, if for any reason it were necessary to access said optical fiber 25 to proceed to the maintenance thereof (connection, modification of the line or damage repair while in service), it is possible to reach it by means of composite repair techniques consisting of the local removal of the reinforcement layers 13, 15 until accessing the fiber 25. However optical fiber 15 is a very fragile element and said operations for removing parts of the layers of the structure can damage it, as is shown in FIG. 2.

According to the invention, the structure 11 includes insulation means of the optical fiber 25 insulating it from the layers in which it is embedded, increasing its possibilities of continued existence and facilitating access thereto at those points susceptible to having maintenance operations (connection, modification of the line or damage repair while in service) performed thereon.

Figure 3:
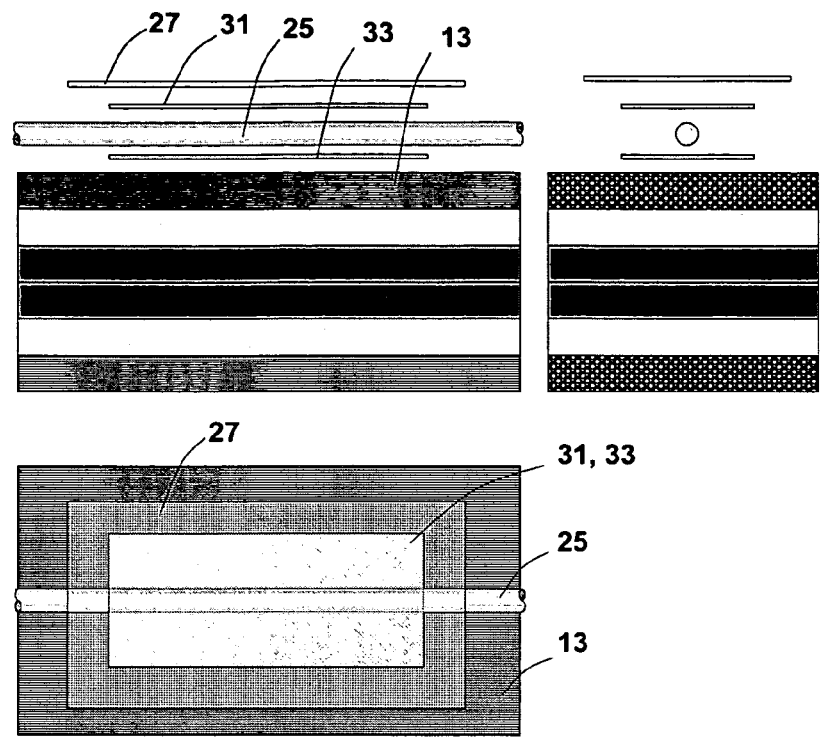
FIG. 3 shows elevational, plan and cross-sectional views of a composite structure according to a first embodiment of the invention in which the optical fiber is embedded in a surface layer.
Figure 4:
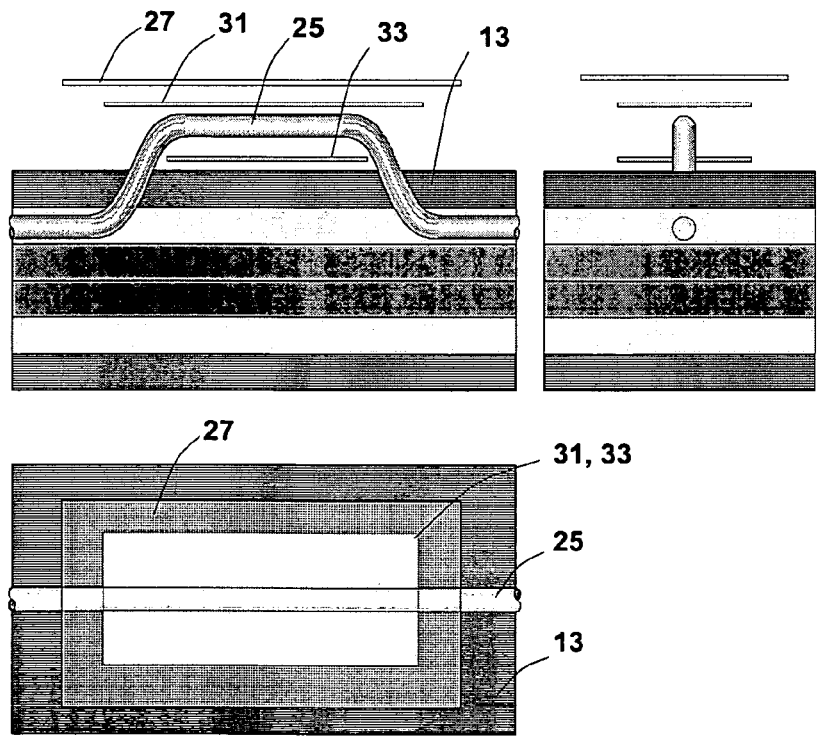
FIG. 4 shows elevational, plan and cross-sectional views of a composite structure according to a second embodiment of the invention in which the optical fiber is embedded inside the structure, leaving only part of it in a surface layer.
Figure 5:
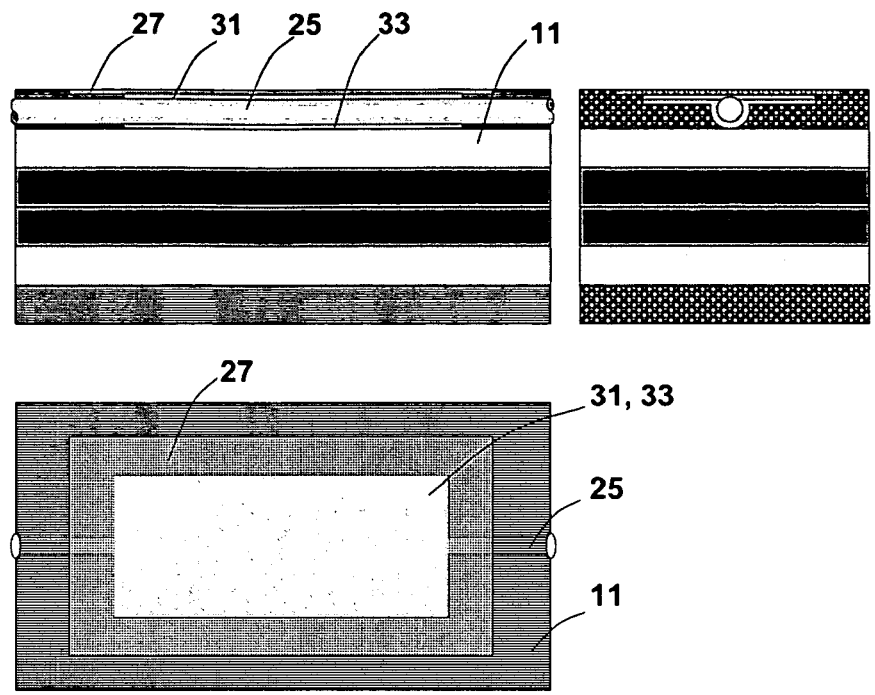
FIG. 5 shows similar views to those of FIGS. 3 and 4 after the structure consolidation process, in which the optical fiber, the separating films and the outer protective layer are embedded in the structure.

Therefore, and as is shown in FIGS. 3-5, in the case of structures 11 with optical fiber 25 embedded in the surface layer 13, and at certain points such as the points of entry of the optical fiber 25 in the structure 11 through the surface, or at intermediate points chosen as suitable points for performing maintenance tasks, the following insulation means are incorporated:

- A bottom separating film 33 between the structure and the optical fiber 25 which will facilitate the separation for the optical fiber from the laminate in order to perform maintenance tasks on it after the consolidation process for consolidating the layers of preimpregnated material to form the structure.
- A top separating film 31, like the previous one preferably oriented in the direction of the reinforcement fibers, located on the optical fiber 25.
- A laminar protective cover 27 having dimensions slightly larger than those of the separating films 31, 33.

The separating films 31, 33 are made of a material that is resistant to the temperature and pressure of the consolidation process, which is incompatible with the resin of the laminate, and the protective cover 27 is made of a preimpregnated fiberglass fabric or a similar material.

The optical fiber 25 cannot be completely embedded in the surface layer 13 as is shown in FIG. 4, it being sufficient that only those areas considered appropriate be embedded.

Figure 6:
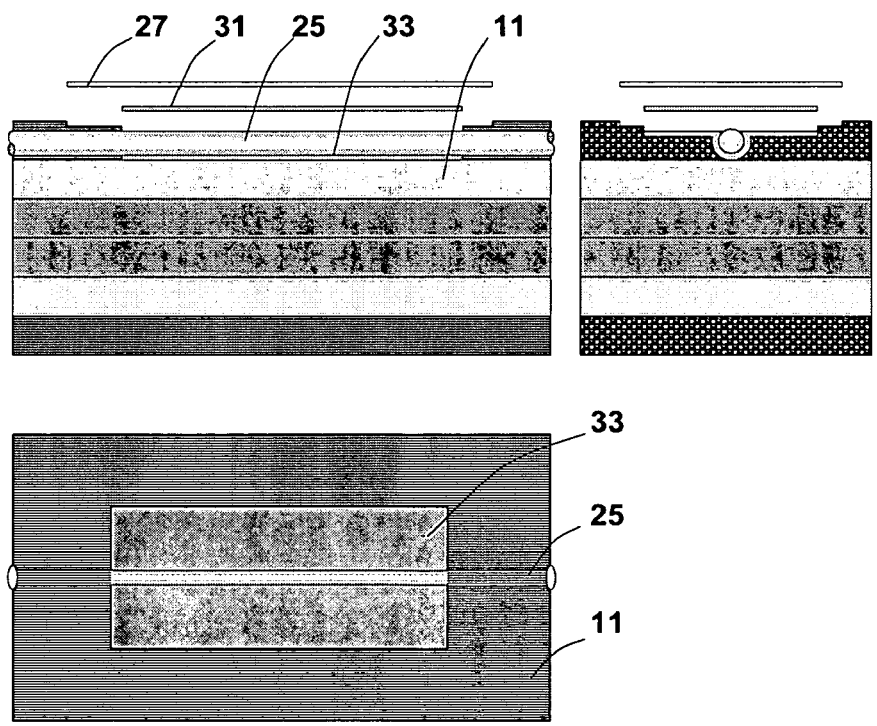
FIG. 6 shows the same view of FIG. 5 after removing the outer protective layer and the outer separating film, the optical fiber being left uncovered.
Figure 7:
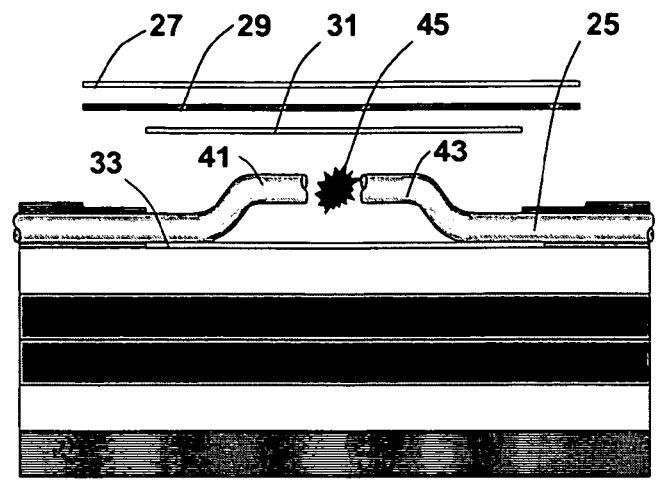
FIG. 7 shows the same view as FIG. 6 in which the previously cut ends of the optical fiber are reconnected after performing the required maintenance operations.

FIGS. 6-7 sequentially illustrate the fundamental steps of a first embodiment of the process of repairing optical fiber in structures herein described.

Figure 8:
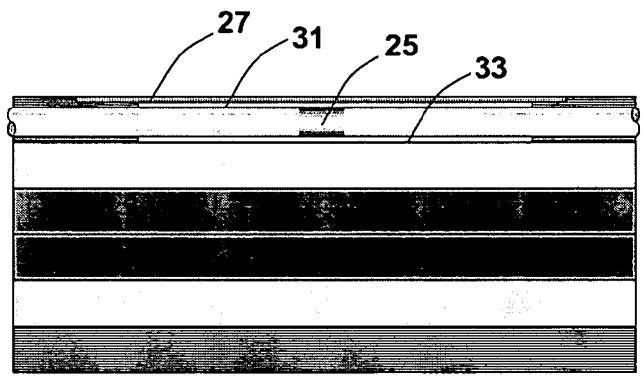
FIG. 8 shows the same view as FIG. 7 after the repair process has ended.

After removing the protective cover 27 and the top separating film 31, the optical fiber 25 that is embedded in the structure 11 but separated from it by the bottom separating film 33 is removed, and the optical fiber is repaired by means of, for example, joining by fusion 45 of the ends 41, 43 of the optical fiber 25 and the part removed from the structure is returned, remaining in the position shown in FIG. 8.

Figure 9:
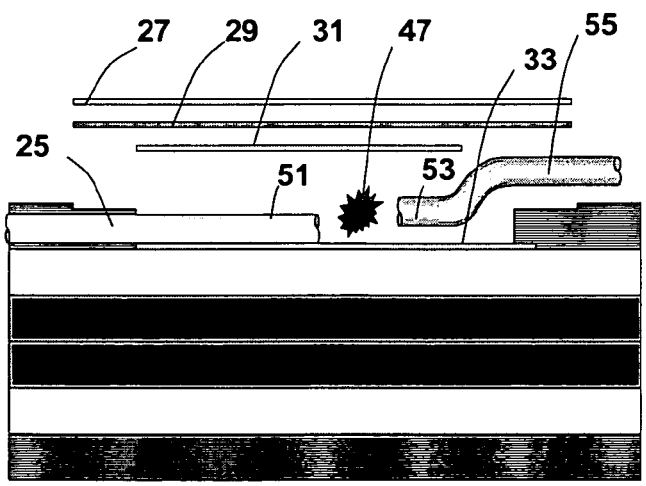
FIG. 9 shows a similar view to that of FIG. 7 in which the embedded optical fiber is repaired by means of an external optical fiber line.
Figure 10:
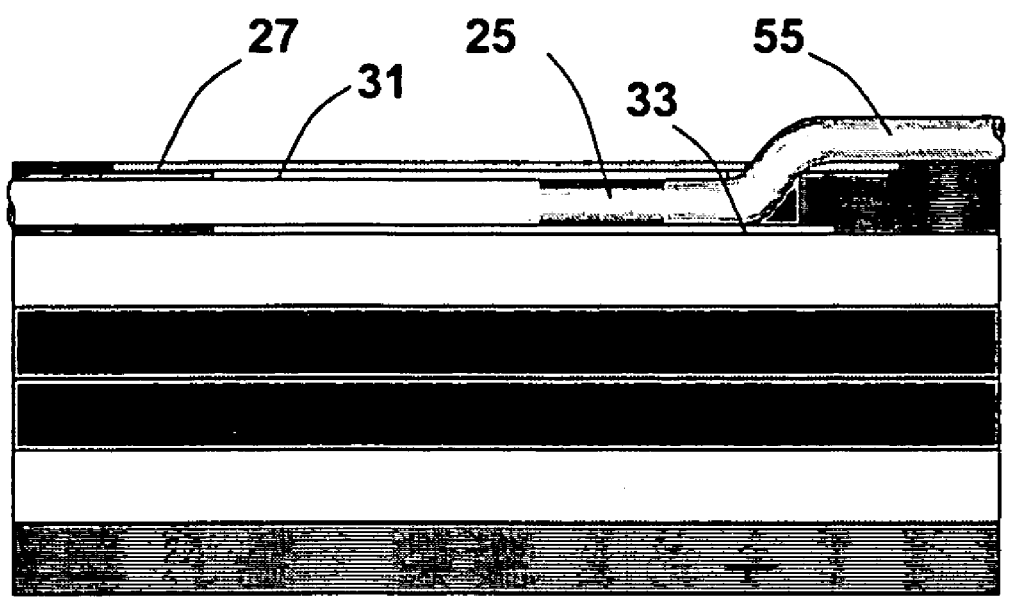
FIG. 10 shows the same view as FIG. 9 after the repair process has ended.

FIGS. 8 and 9 show a second embodiment of the repair process which differs from the first one only in that the optical fiber 25 repair is carried out, for example, by means of joining by fusion 47 one of its ends 51 to the end 53 of an external optical fiber 55, reconducting the optical signal through an alternative path.

In both processes, the repair can include returning the separating films 31, 33 and the protective cover 27 by supplying a small amount of adhesive 29 on the top separating film 33 and applying a consolidation process that is common in repairing composite laminates.

In the preferred embodiment described above any modifications comprised within the scope defined by the following claims can be introduced.

The invention claimed is:

1. In a composite structure (11) for a primary structure of an aircraft, the composite structure comprising at least a surface layer (13), another layer (15, 17, 19, 21, 23) and an optical fiber (25) for structural monitoring purposes at least partly embedded in one of the layers, the improvements characterized in that:
   a) the embedded part of the optical fiber (25) is integrated in a the surface layer (13) of the composite structure (11) to be susceptible to requiring repair; and
   b) the composite structure (11) includes insulation means of at least areas of the embedded part of the optical fiber (25) with respect to the surface layer (13) said insulation means including a top separating film (31) and a bottom separating film (33), the top separating film (31) also comprising a laminar protective cover (27) arranged on the top of said top separating film (31).

2. A composite structure according to claim 1, characterized in that said protective cover (27) is made of preimpregnated fiberglass fabric.

3. A composite structure according to claim 2, characterized in that all of the optical fiber (25) is embedded in a surface layer (13) of the structure (11).

4. A composite structure according to claim 2, characterized in that the part of the optical fiber (25) not embedded in the surface layer (13) of the structure (11) is embedded in the layer (15) adjacent to it or deeper.

5. A process of repairing the optical fiber (25) embedded in a composite structure (11) according to claim 3, characterized in that it comprises the following steps:
   a) Removing the protective cover (27) and the top separating film (31) from the optical fiber (25) area in need of repair;
   b) Extracting the optical fiber (25) area in need of repair from the composite structure (11);
   c) Repairing the optical fiber (25);
   d) Relocating the repaired optical fiber (25) area in the composite structure (11);
   e) Providing a new protective cover (27) on the repaired optical fiber (25) area.

6. A process of repairing the optical fiber (25) embedded in a composite structure (11) according to claim 5, characterized in that step d) includes the following additional steps:
   d') providing a new top separating film (31) on the repaired optical fiber (25) area;
   d") supplying adhesive (29) on the new separating film (31).

7. A process of repairing the optical fiber embedded in a composite structure according to claim 5, characterized in that the repaired optical fiber (25) area connects ends (41, 43) of optical fiber (25) embedded in the composite structure.

8. A process of repairing the optical fiber embedded in a composite structure according to claim 5, characterized in that the repaired optical fiber (25) area connects one end (51) of optical fiber (25) embedded in the composite structure (11) with one end (53) of an optical fiber (55) located outside the composite structure (11).

9. A process of repairing the optical fiber (25) embedded in a composite structure (11) according to claim 4, characterized in that it comprises the following steps:

a) Removing the protective cover (27) and the top separating film (31) from the optical fiber (25) area in need of repair;
b) Extracting the optical fiber (25) area in need of repair from the composite structure (11);
c) Repairing the optical fiber (25);
d) Relocating the repaired optical fiber (25) area in the composite structure (11);
e) Providing a new protective cover (27) on the repaired optical fiber (25) area.

10. A process of repairing the optical fiber embedded in a composite structure according to claim 6, characterized in that the repaired optical fiber (25) area connects ends (41, 43) of optical fiber (25) embedded in the composite structure.

11. A process of repairing the optical fiber embedded in a composite structure according to claim 6, characterized in that the repaired optical fiber (25) area connects one end (51) of optical fiber (25) embedded in the composite structure (11) with one end (53) of an optical fiber (55) located outside the composite structure (11).

12. A process of repairing the optical fiber (25) embedded in a composite structure (11) according to claim 11, characterized in that step d) includes the following additional steps:
d') providing a new top separating film (31) on the repaired optical fiber (25) area;
d") supplying adhesive (29) on the new separating film (31).

13. A process of repairing the optical fiber embedded in a composite structure according to claim 9, characterized in that the repaired optical fiber (25) area connects ends (41, 43) of optical fiber (25) embedded in the composite structure.

14. A process of repairing the optical fiber embedded in a composite structure according to claim 12, characterized in that the repaired optical fiber (25) area connects ends (41, 43) of optical fiber (25) embedded in the composite structure.

15. A process of repairing the optical fiber embedded in a composite structure according to claim 9, characterized in that the repaired optical fiber (25) area connects one end (51) of optical fiber (25) embedded in the composite structure (11) with one end (53) of an optical fiber (55) located outside the composite structure (11).

16. A process of repairing the optical fiber embedded in a composite structure according to claim 12, characterized in that the repaired optical fiber (25) area connects one end (51) of optical fiber (25) embedded in the composite structure (11) with one end (53) of an optical fiber (55) located outside the composite structure (11).

* * * * *